US009582628B1

(12) United States Patent
Oishei et al.

(10) Patent No.: US 9,582,628 B1
(45) Date of Patent: Feb. 28, 2017

(54) METHOD AND APPARATUS FOR PERFORMING AUTOMATIC DECOUPLING CAPACITOR SELECTION FOR POWER DISTRIBUTION NETWORKS

(71) Applicant: Altera Corporation, San Jose, CA (US)

(72) Inventors: Andrew E. Oishei, San Diego, CA (US); Dmitry Denisenko, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/095,184

(22) Filed: Dec. 3, 2013

Related U.S. Application Data

(62) Division of application No. 13/232,281, filed on Sep. 14, 2011, now Pat. No. 8,627,261.

(51) Int. Cl.
G06F 17/50 (2006.01)
(52) U.S. Cl.
CPC .............................. *G06F 17/5072* (2013.01)
(58) Field of Classification Search
USPC ........................................................ 716/120
See application file for complete search history.

(56) References Cited

U.S. PATENT DOCUMENTS 5,644,500 A * 7/1997 Miura et al. .................. 716/120
6,191,479 B1 2/2001 Herrell et al.
7,802,220 B1 * 9/2010 Popovich et al. ............ 716/120
7,817,439 B2 10/2010 Hosomi
8,166,447 B1 * 4/2012 Smith et al. .................. 716/136
2001/0034587 A1 10/2001 Anderson et al.
2002/0169590 A1 11/2002 Smith et al.
2005/0237320 A1 * 10/2005 Itoh .......................... G06T 11/60
345/418
2006/0231947 A1 * 10/2006 Hosomi et al. ............... 257/724
2012/0136598 A1 * 5/2012 Dmitriev-Zdorov ........... 702/65

OTHER PUBLICATIONS

U.S. Appl. No. 13/232,281, filed Sep. 14, 2011, In Re Application of Andrew E. Oishei, et al.
Smith, et al.; "Power Distribution System Design Methodology and Capacitor Selection for Modern CMOS Technology"; IEEE Transactions on Advanced Packaging, vol. 22, No. 3, Aug. 1999, pp. 284-291.
Fizesan, et al.; "Simulation for Power Integrity to Design a PCB for an Optimum Cost", 2010 IEEE 16th International Symposium for Design and Technology in Electronic Packaging (SIITME), Sep. 23-26, 2010, pp. 141-146.

\* cited by examiner

*Primary Examiner* — Bryce Aisaka
(74) *Attorney, Agent, or Firm* — L. Cho

(57) ABSTRACT

A method for designing a power distribution network (PDN) for a system implementing a target device includes computing a target PDN impedance value for the PDN. For each switching frequency of the target device where an effective PDN impedance value for the PDN is greater than the target PDN impedance value, one or more decoupling capacitors for one or more capacitor types are identified to add to the PDN to drive the effective PDN impedance value below the target PDN value. A selection of decoupling capacitors identified is refined to reduce one or more of a cost of the PDN and space required for implementing the PDN.

19 Claims, 10 Drawing Sheets

METHOD AND APPARATUS FOR PERFORMING AUTOMATIC DECOUPLING CAPACITOR SELECTION FOR POWER DISTRIBUTION NETWORKS

RELATED APPLICATION

This application is a divisional of and claims priority and benefit to U.S. application Ser. No. 13/232,281 filed on Sep. 14, 2011, entitled, "Method and Apparatus for Performing Automatic Decoupling Capacitor Selection for Power Distribution Networks".

TECHNICAL FIELD

Embodiments of the present invention relate to tools for designing power distribution networks for systems on target devices. More specifically, embodiments of the present invention relate to a method and apparatus for performing automatic decoupling capacitor selection for power distribution networks (PDNs).

BACKGROUND

Target devices such as field programmable gate arrays (FPGAs), structured application specific integrated circuits (ASICs), and ASICs are used to implement large systems that may include million of gates and megabits of embedded memory. Switching activities of components in a target device put stress on a PDN supporting the target device. Target devices such as FPGAs do not consume power evenly. The changing states of logic and memory elements require the target device's PDN to supply more power than if the logic and memory elements were operating in a constant state. When a large number of logic and memory elements change state simultaneously, a large demand is placed on the PDN. Excessive voltage swings by the target device can lead to faulty operation of the target device.

To avoid unacceptable voltage deviations, a PDN should be properly decoupled over switching frequencies of the target device. On-board capacitors typically operate to decouple the PDN over a range of switching frequencies that cannot be decoupled by on-die or on-package capacitors of the target device. These decoupling capacitors store electric charge. When extra current is required from a PDN, the decoupling capacitors may meet some of the demand by discharging.

Current decoupling capacitor selection techniques require a designer to manually select the appropriate decoupling capacitors to add to a PDN. The iterative approach needed often requires a significant amount of time from the designer.

SUMMARY

A method and apparatus for performing automatic decoupling capacitor selection for a power distribution network is disclosed. According to an embodiment of the present invention, board, package, die, system, and available capacitor parameters are provided to a computer aided design (CAD) tool to select decoupling capacitors. Decoupling capacitors are selected by the CAD tool to achieve one or more goals that may include reducing the space required for the decoupling capacitors on the board, and reducing the total cost for implementing the decoupling capacitors.

According to an embodiment of the present invention, a target PDN impedance value for a PDN is computed. For each switching frequency of a target device where an effective PDN impedance value is greater than the target impedance value, decoupling capacitors are identified to add to the PDN to drive the effective PDN value below the target PDN value. The selection of decoupling capacitors identified is refined to reduce the cost of implementing the PDN and/or to reduce the space required for implementing the decoupling capacitors. Placement locations of the decoupling capacitors may also be determined.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
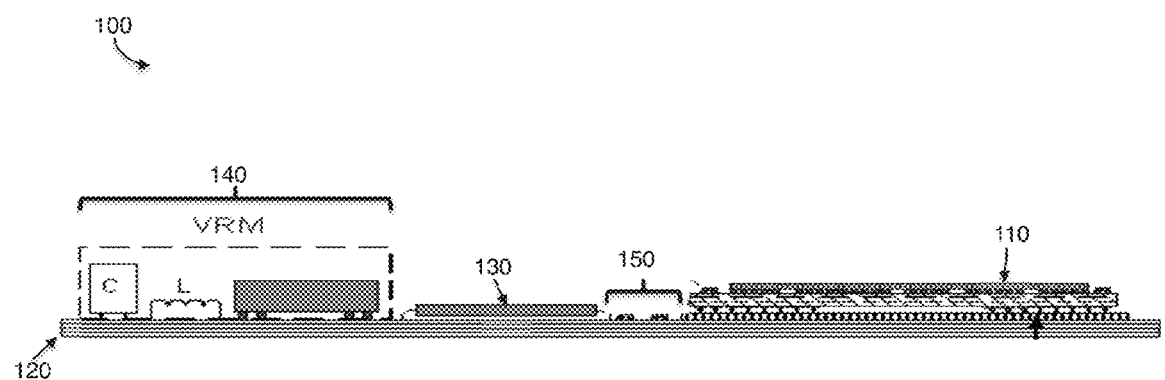
FIG. 1 illustrates a system where a power distribution network resides according to an exemplary embodiment of the present invention.

FIG. 1 illustrates a system 100 where a power distribution network (PDN) resides according to an exemplary embodiment of the present invention. The system includes a target device 110. The target device 110 may be a circuit such as an FPGA, structured ASIC, ASIC, or other device. The target device 110 includes a die and an outer package and is coupled to board 120. According to an embodiment of the present invention, board 120 is a printed circuit board. A PDN resides on the board 120 to provide power to the target device 110 and other components 130 coupled to the board 120. The PDN may include a voltage regulator module (VRM) 140, decoupling capacitors 150, and vias and traces connecting the VRM to decoupling capacitors 150. The PDN may also include components and interconnects on the package and die of the target device 110 and components 130 to distribute and regulate power.

Figure 2:
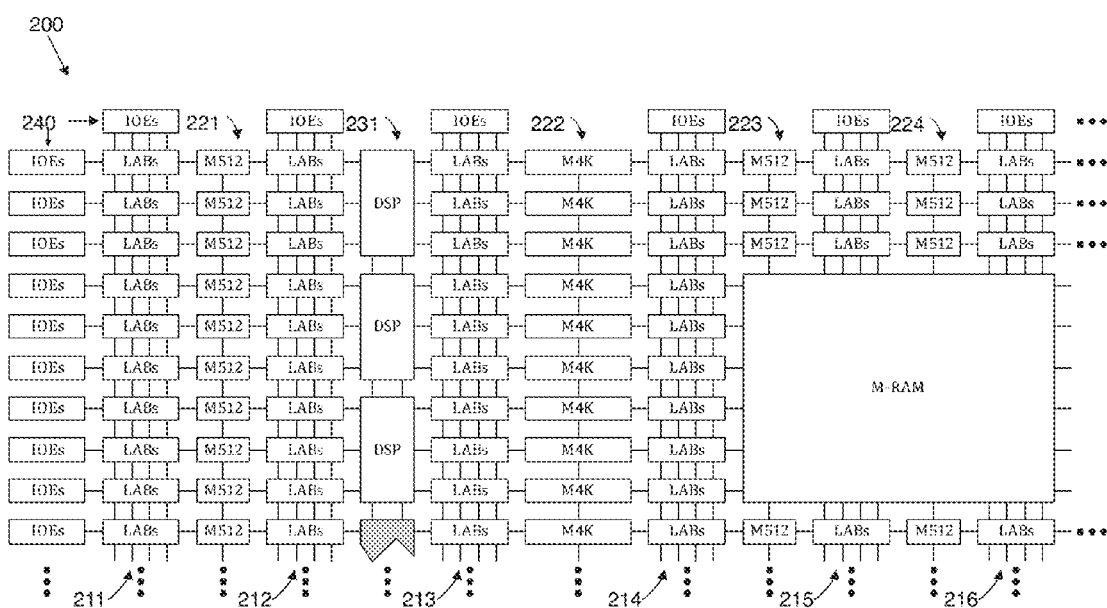
FIG. 2 illustrates an exemplary target device according to an embodiment of the present invention.

FIG. 2 illustrates an exemplary target device 200 according to an embodiment of the present invention. The target device 200 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 200. Columns of LABs are shown as 211-216. It should be appreciated that the logic block may include additional or alternate components.

The device 200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 200. Columns of memory blocks are shown as 221-224.

The device 200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 200 and are shown as 231.

The device 200 includes a plurality of input/output elements (IOEs) 240. Each IOE feeds an IO pin (not shown) on the device 200. The IOEs 240 are located at the end of LAB rows and columns around the periphery of the device 200. Each IOE may include a bidirectional IO buffer and a plurality of registers for registering input, output, and output-enable signals.

The device 200 may include routing resources such as LAB local interconnect lines, row interconnect lines ("H-type wires"), and column interconnect lines ("V-type wires") (not shown) to route signals between components on the target device.

Figure 3:
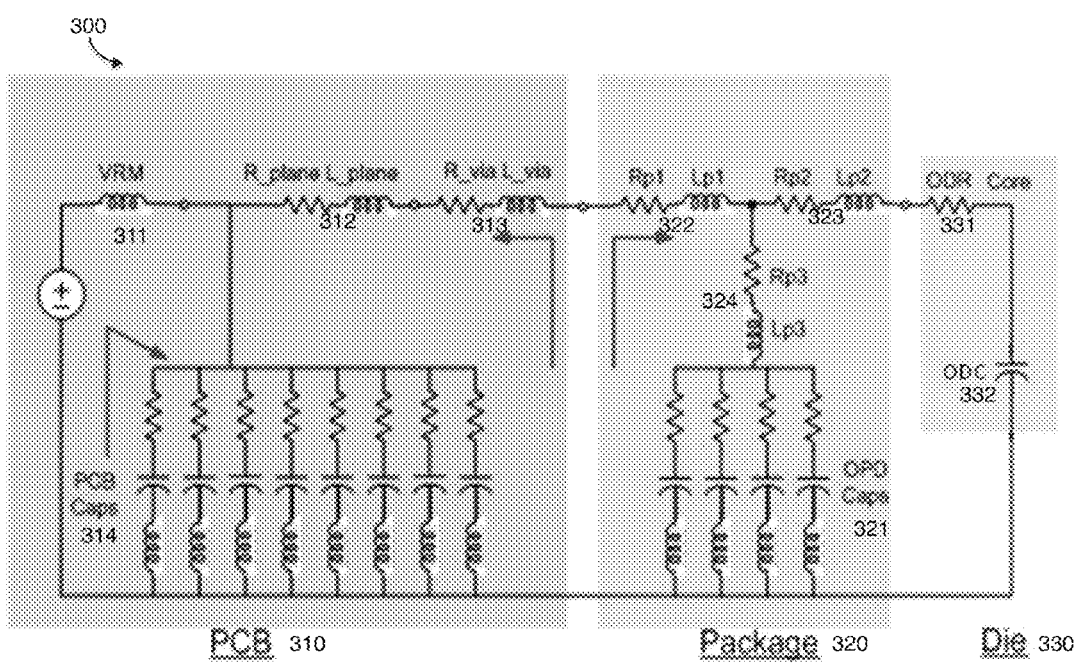
FIG. 3 illustrates a model of an exemplary power distribution network according to an embodiment of the present invention.

FIG. 3 illustrates a schematic of an exemplary PDN according to an embodiment of the present invention. The schematic of the PDN 300 includes a first section 310 that models properties on a board. The first section 310 includes a VRM 311 modeled by an inductor. The first section also includes a plurality of decoupling capacitors (PCB Caps) 314 each modeled by a resistor, capacitor, and inductor. The spreading resistance and inductance on the board plane (R_plane L_plane) are modeled by a resistor and inductor 312. The resistance and inductance of vias on the board plane (R_via L_via) are modeled by a resistor and inductor 313.

The schematic of the PDN 300 includes a second section 320 that models properties of a package of a target device. The second section includes a plurality of decoupling capacitors (OPD Caps) each modeled by a resistor, capacitor, and inductor 321. The second section also includes trace resistance and inductance on the package (Rp1-3, LP1-3) modeled by a resistor and inductor 322-324.

The schematic of the PDN 300 includes a third section 330 that models properties of a die of a target device. The third section 330 includes on die resistance (ODR) modeled by a resistor 331 and on die capacitance (ODC) modeled by a capacitor 332.

It should be appreciated that a system implementing a target device such as an FPGA may use a plurality of PDNs. Each PDN may serve different sections of the FPGA at different voltages. For example, the core logic (LABs) and memory blocks may use a different PDN than input/outputs elements (IOEs). Phase lock loops (PLLs) may use another PDN to ensure that noise generated by IOE switching does not affect the quality of the clock signal generated by the PLLs.

The effective PDN impedance value, Zeffective, at a given frequency indicates how well a PDN responds to power demands of a system at that frequency. The lower the effective PDN impedance value is, the better the PDN responds. A target impedance value for a PDN, Ztarget, may be used to design a PDN that responds well to power demands of a system. According to an embodiment of the present invention, Ztarget may be computed by taking the ratio of a maximum allowable voltage swing of the components supported by the PDN and a maximum transient current that will be seen by the PDN. This relationship may be denoted as Ztarget=$\Delta V/\Delta I$.

For some target devices, on-package and on-die decoupling capacitors can effectively respond to current demands with frequencies at approximately 50 MHz and higher. On-board voltage regulators can typically respond to current demands of approximately 100 KHz or lower. This typically leaves a range of frequencies to be handled by on-board decoupling capacitors. The high-end boundary of this range is referred to as the effective frequency, Feffective.

Figure 4:
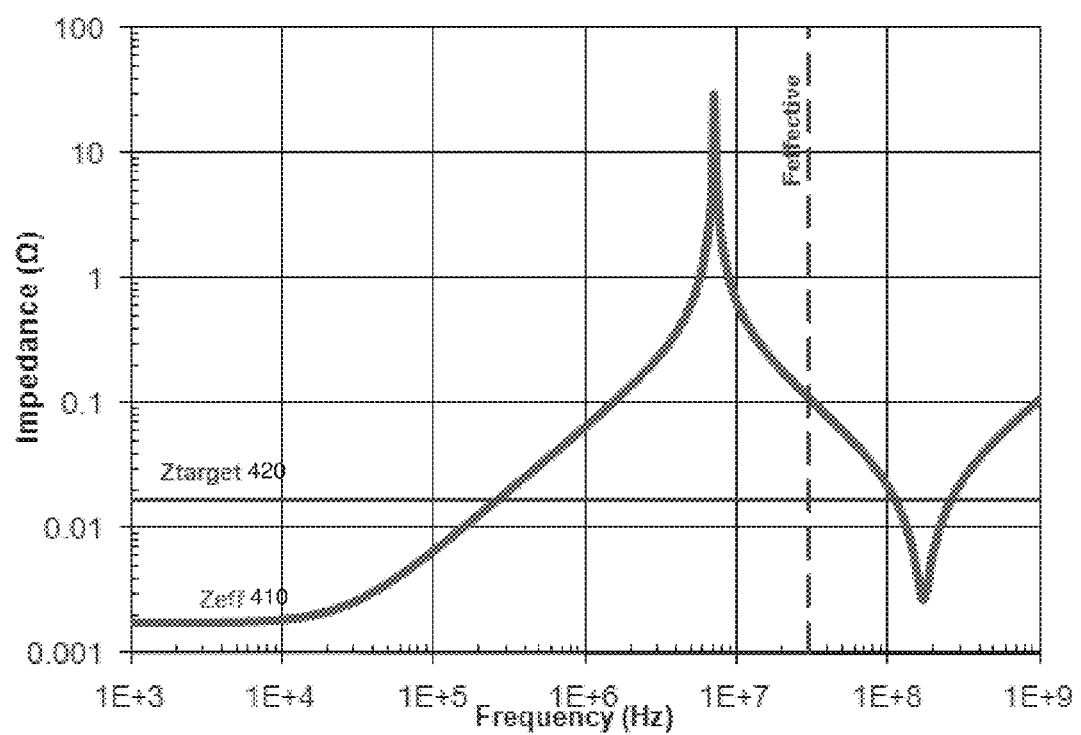
FIG. 4 is a plot illustrating an exemplary power distribution network's impedance characteristic when no decoupling capacitors are used according to an embodiment of the present invention.

FIG. 4 is a plot illustrating an exemplary power distribution network's impedance characteristic where no decoupling capacitors are used. The line labeled Zeffective 410 illustrates the effective PDN impedance value at each frequency. The line labeled Ztarget 420 illustrates the target impedance value for the PDN. In this example, Feffective is 30 MHz. As illustrated, the effective PDN impedance value exceeds the target impedance value at 200 KHz to the effective frequency of 30 MHz.

Figure 5:
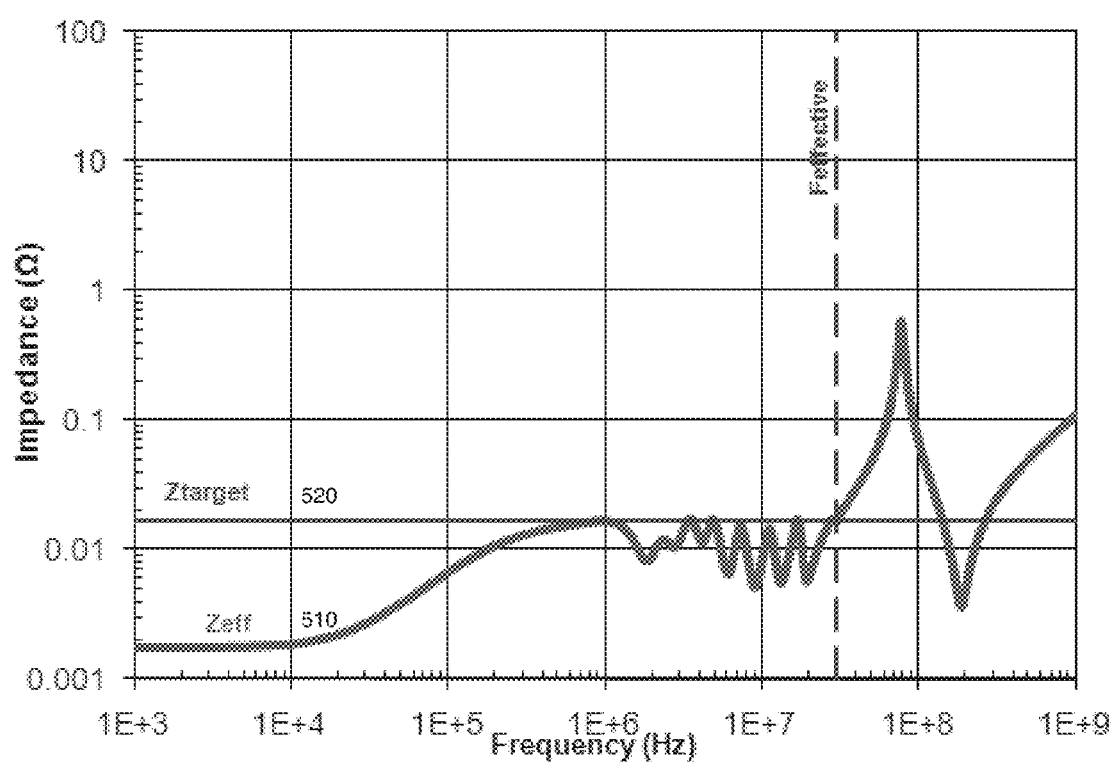
FIG. 5 is a plot illustrating the exemplary power distribution network's impedance characteristic using decoupling capacitors according to an embodiment of the present invention.

FIG. 5 is a plot illustrating the exemplary power distribution network's impedance characteristic using decoupling capacitors. As illustrated, the effective PDN impedance value, illustrated by line 510, is at or below the target impedance value for the PDN, illustrated by line 520, up to the effective frequency of 30 MHz.

Figure 6:
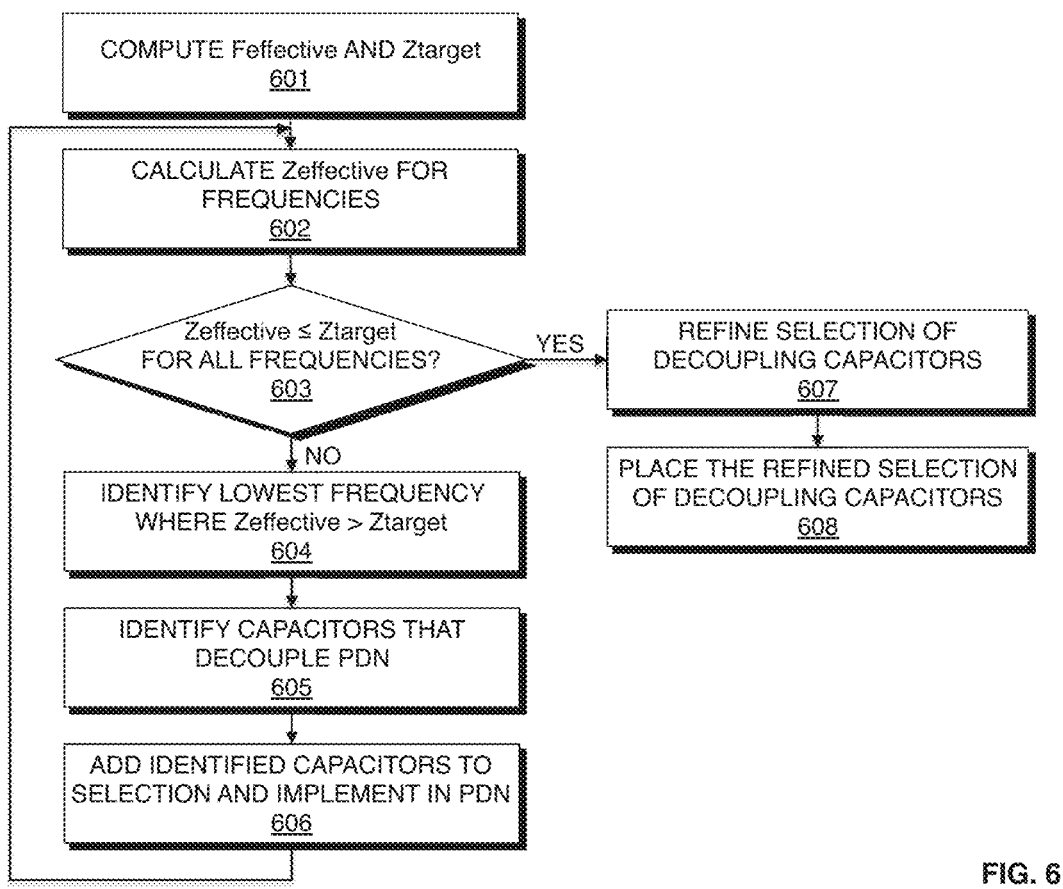
FIG. 6 is a flow chart illustrating a method for selecting decoupling capacitors for a power distribution network according to an exemplary embodiment of the present invention.

FIG. 6 is a flow chart illustrating a method for selecting decoupling capacitors for a power distribution network according to an exemplary embodiment of the present invention. The procedure described in FIG. 6 may be performed by an EDA tool. At 601, the highest frequency at which board decoupling capacitors respond or affect the effective PDN impedance is computed (Feffective). According to an embodiment of the present invention, Feffective is computed based on properties of the die and package of the target device, and the inductive and capacitive values of the board. The target PDN impedance value (Ztarget) is also computed. According to an embodiment of the present invention, Ztarget may be computed by taking the ratio of a maximum allowable voltage swing of the components supported by the PDN ($\Delta V$) and a maximum transient current that will be seen by the PDN ($\Delta I$). The maximum allowable voltage swing of the components may be derived from a specification of the board, target device, and other components on the board. An estimation may be made as to how much power is required for the PDN. The estimation may take into account properties of the board which may be provided such as the resistive, inductive, and capacitive (RLC) properties of the power planes on the board, the RLC properties of vias on the board, the RLC properties of the voltage regulator module on the board, the spreading inductance effects on the board, and other properties. The estimation may also take into account properties of a target device such as an amount of logic used by a system implemented on the target device, a number of IOs used by the system implemented on the target device, which frequencies have switching activities, whether enable signals are used on the target device, and/or other information. According to an embodiment of the present invention, half of the estimated current value is designated as the maximum transient current seen by the PDN. It should be appreciated that other types of estimation and designations may be used for the maximum transient current.

At 602, the effective PDN impedance value (Zeffective) of the PDN is computed at frequencies up to Feffective. According to an embodiment of the present invention, the effective PDN impedance value may be computed analytically or be by using approximation methods. Alternatively, simulation may be used to compute Zeffective.

At 603, it is determined whether the effective PDN impedance value is less than or equal to the target PDN impedance value for all frequencies up to the effective impedance. If the effective PDN impedance value is less than or equal to the target PDN impedance value for all frequencies up to the effective impedance, control proceeds to 607. If the effective PDN impedance value is not less than or equal to the target PDN impedance for all frequencies up to the effective impedance, control proceeds to 604.

At 604, the lowest frequency at which the effective PDN impedance value is greater than the target PDN impedance value is identified.

At 605, the number of capacitors and capacitor types required for decoupling the PDN to lower the effective PDN impedance value to or below the target PDN impedance value are identified. According to an embodiment of the present invention, the number and type of capacitors that decouple an offending frequency, where Zeffective is greater than Ztarget, are selected starting with the lowest offending frequency. The PDN is tested to determine whether the effective PDN impedance value is lowered to or below the target PDN impedance value. According to an embodiment of the present invention, this procedure may be repeated until all offending frequencies have been decoupled or a predetermined number of capacitors are selected. According to an embodiment of the present invention, for each capacitor type available starting at the capacitor type having the smallest capacitance value, a single capacitor is implemented and the PDN is tested to determine whether the effective PDN impedance value is lowered to or below the target PDN impedance value. Additional capacitors of that type and additional capacitor types may be added and tested until the effective PDN impedance value is lowered to or below the target PDN impedance value. Testing the PDN to determine the effective PDN impedance value may involve performing a simulation or using analytic or approximation methods.

At 606, the decoupling capacitors identified at 605 are added to the selection of decoupling capacitors and are implemented in the PDN. Control returns to 602.

At 607, the selection of decoupling capacitors is refined. According to an embodiment of the present invention, the refinement of the selection of decoupling capacitors improves one or more cost metrics. According to an aspect of the present invention, a reduction in the area on the board required for implementing the decoupling capacitors is sought. This may be achieved by reducing the total number of capacitors selected. Reducing capacitor count may free up board space for other devices, reduces via count, and may reduce the size of the board. According to another aspect of the present invention, a reduction in the cost of implementing the PDN is sought. This may be achieved by selecting decoupling capacitors of lower cost or using fewer capacitors. Selection of decoupling capacitors may be based on the price of a capacitor and/or whether capacitors are available in inventory. The cost of a capacitor may also include a topped up estimate that includes the cost of mounting the capacitor. Different mounting methods are available which may result in differing assembly costs as well as differing space requirements. It should be appreciated that other goals and combination of goals maybe sought. The associated cost and inventory information related to the capacitors are provided to the EDA tool to allow the EDA tool to generate an appropriate selection.

At 608, the refined selection of decoupling capacitors is placed on the board. According to an embodiment of the present invention, placement may include identifying a side of the board to place the decoupling capacitors and/or identifying a specific location on the board to place the decoupling capacitors.

Figure 7:
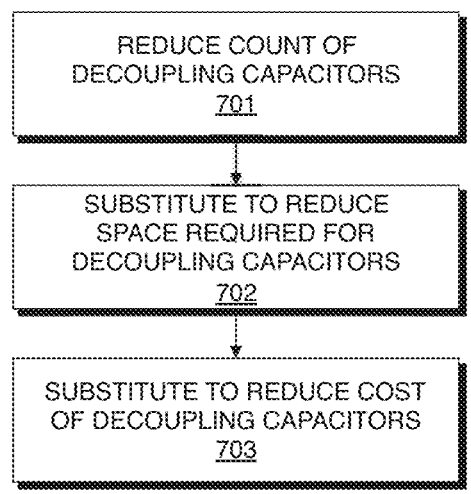
FIG. 7 is a flow chart illustrating a method for refining a selection of decoupling capacitors according to an exemplary embodiment of the present invention.

FIG. 7 is a flow chart illustrating a method for refining a selection of decoupling capacitors according to an exemplary embodiment of the present invention. The procedure described in FIG. 7 may be used to implement procedure 607 described in FIG. 6. At 701, a reduction in the number of decoupling capacitors selected is attempted. According to an embodiment of the present invention, for every type of capacitor selected, a reduction in the count of capacitors is attempted while maintaining the effective PDN impedance value below or equal to the target PDN impedance value. In one embodiment, a first type of capacitor is identified. The number of selected capacitors of this first type is reduced by one. The effective PDN impedance value is computed for all frequencies up to the effective frequency. If the effective PDN impedance value is less than or equal to the target PDN impedance value for all frequencies up to the effective frequency, the number of selected capacitors of this first type is reduced by another one. This may continue until the effective PDN impedance is greater than the target PDN impedance value where then the number of selected capacitors reverts back to the number last yielding an effective PDN impedance value less than or equal to the target PDN impedance value. Afterwards, the procedure continues for a second type of capacitors in a similar fashion until all types of capacitors have been analyzed for count reduction. It is appreciated that the number of capacitors may be reduced by two, three, or any other value depending on its application.

As such, reducing the number of capacitors in increments of one is merely exemplary and not intended to limit the scope of the present invention.

At 702, an exchange of one or more decoupling capacitors for a decoupling capacitor of smaller size is attempted. According to an embodiment of the present invention, for every type of capacitor selected, a substitution for a smaller sized capacitor is attempted while maintaining the effective PDN impedance value below or equal to the target PDN impedance value. In one embodiment, a first type of capacitor is identified. Two capacitors of the first type are substituted for a single capacitor of another type where the capacitor of the another type has a smaller size than the combined size of the two capacitors of the first type. The effective PDN impedance value is computed for all frequencies up to the effective frequency. If the effective PDN impedance value is less than or equal to the target PDN impedance value for all frequencies up to the effective frequency, another substitution for two capacitors of the first type for a single capacitor of the another type is performed. The substitutions may continue until the effective PDN impedance computed is greater than the target PDN impedance value where the number of substituted capacitors reverts back to the number last yielding an effective PDN impedance value less than or equal to the target PDN impedance value. Afterwards, the procedure continues for substituting two capacitors of additional types in a similar fashion until all types of capacitors have been analyzed for substitution. It should be appreciated that the substitution described above may alternatively involve substituting greater than or fewer than two capacitors of a first type for a capacitor of another type having a size smaller than the combined size of the two capacitors of the first type.

At 703, an exchange of one or more decoupling capacitors for a decoupling capacitor of lower cost is attempted. According to an embodiment of the present invention, for every type of capacitor selected, a substitution for another type of capacitor having a lower cost is attempted while maintaining the effective PDN impedance value below or equal to the target PDN impedance value. In one embodiment, a first type of capacitor is identified. A capacitor of the first type is substituted for a capacitor of another type, e.g., a second type, where the capacitor of the another type has a lower cost than the capacitor of the first type. The effective PDN impedance value is computed for all frequencies up to the effective frequency. If the effective PDN impedance value is less than or equal to the target PDN impedance value for all frequencies up to the effective frequency, another substitution for a capacitors of the first type for a capacitor of the another type, e.g., a third type, is performed. The substitutions may continue until the effective PDN impedance computed is greater than the target PDN impedance value where then the number of substituted capacitors reverts back to the number last yielding an effective PDN impedance value less than or equal to the target PDN impedance value. Afterwards, the procedure continues for substituting capacitors of additional types in a similar fashion until all types of capacitors have been analyzed for substitution. It should be appreciated that the substitution may involve substituting one or more capacitors of a first type for one or more capacitors of another type having a cost lower than the cost of the substituted capacitor(s) of the first type. It should further be appreciated that the capacitor of the another type may be targeted to be larger or smaller than the size of the one or more capacitors of the first type. It should be appreciated that the procedures described with reference to FIG. 7 may be iterative. In this embodiment, if a change were made during one of the procedures 701, 702, and 703, control would return to procedure 701. Moreover, it is appreciated that any given one of the methods described above may be performed without necessarily requiring other steps to be performed. In other words, any of the method steps described above or any combination thereof may be performed.

When computing Zeffective for the procedures illustrated in FIGS. 6 and 7, the PDN network is modeled. According to an embodiment of the present invention, the modeling may be achieved using analytic calculations. Alternatively, modeling the PDN network may be achieved by performing simulations.

According to an embodiment of the present invention, placing the refined selection of decoupling capacitors as described at 608 in FIG. 6 involves identifying a side on board to place the decoupling capacitors. Generally, the side of the board that is closest to the power plane is the preferred side for placing the majority of the decoupling capacitors. In one embodiment, decoupling capacitors are placed in a mirroring configuration on both sides of the board. Placing decoupling capacitors on both sides of a board for the same PDN would allow fewer vias to be used. This is advantageous because the design allows for easier breakout, and a reduction in board area required for the decoupling capacitors.

Figure 8:
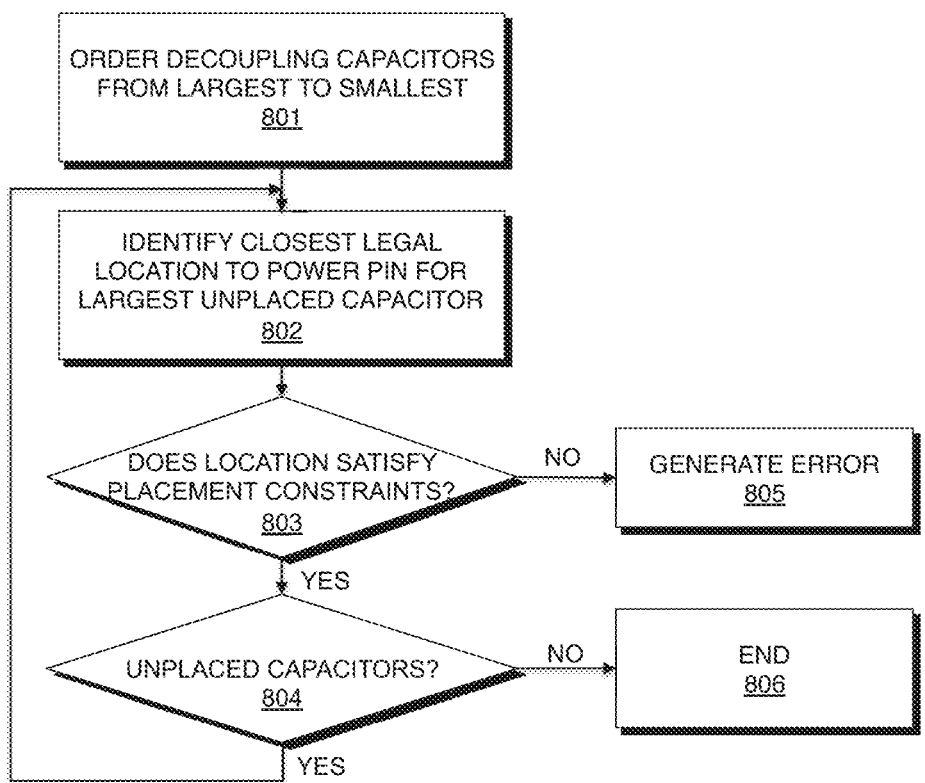
FIG. 8 is a flow chart illustrating a method for placing decoupling capacitors according to an exemplary embodiment of the present invention.

It should be appreciated that placing the refined selection of decoupling capacitors may also involve finding physical locations for each decoupling capacitor on the board. In this embodiment, the board size and stack-up information, which includes the number of layers and material type of each layer, are provided to an EDA tool. The physical dimensions and locations of components placed on the board such as, for example, the target device, voltage regulator module, memory, and via pads are also provided to the EDA tool. FIG. 8 is a flow chart illustrating a method for placing decoupling capacitors for a PDN according to an exemplary embodiment of the present invention. The procedure illustrated in FIG. 8 may be used to implement procedure 608 illustrated in FIG. 6.

At 801, the decoupling capacitors are sorted and ordered. According to an embodiment of the present invention, the capacitors are ordered from largest in board footprint to smallest in board footprint.

At 802, a location for the largest, unplaced capacitor is identified. According to an embodiment of the present invention, the location is a legal location closest to a power pin. A legal location is a location on the board that is not occupied by another component.

At 803, it is determined whether the identified location for the capacitor satisfies capacitor placement constraints. According to an embodiment of the present invention, the capacitor placement constraint may require that the capacitor be placed within a fixed distance from the target device power pin. The fixed distance may be a function of a wavelength of a wave through a material in a component supported by the PDN. If it is determined that the identified location satisfies capacitor placement constraints, control proceeds to 804. If it is determined that the identified location does not satisfy capacitor placement constraints, control proceeds to 805.

At 804, it is determined whether any unplaced capacitor exists. If an unplaced capacitor exists, control returns to 802. If all capacitors have been placed, control proceeds to 806.

At 805, an error is generated indicating that a placement location for the decoupling capacitor cannot be found.

At 806, control terminates the procedure.

FIGS. 6 through 8 are flow charts that illustrate embodiments of the present invention. Some of the techniques illustrated may be performed sequentially, in parallel or in an order other than that which is described. Some procedures described may also be repeated. It should be appreciated that not all of the techniques described are required to be performed, that additional techniques may be added, and that some of the illustrated techniques may be substituted with other techniques. For example, instead of using a simple greedy technique where a solution is modified until the solution gets worse, a simulated annealing technique may be used to change a solution in a random manner. A solution may be accepted even if it is not an improvement. However, with the simulated annealing technique, as the procedure progresses, fewer worse solutions are accepted.

Figure 9:
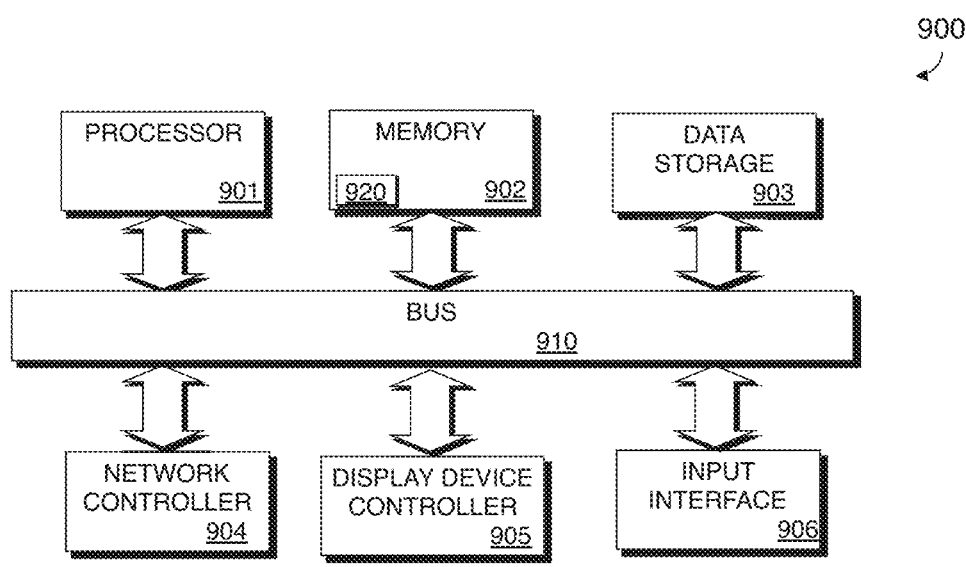
FIG. 9 illustrates a block diagram of a computer system implementing a system designer according to an embodiment of the present invention.

FIG. 9 is a block diagram of an exemplary computer system 900 in which an example embodiment of the present invention resides. The computer system 900 may be used to implement a system designer such as an EDA tool. The computer system 900 includes a processor 901 that processes data signals. The processor 901 is coupled to a bus 910 that transmits data signals between components in the computer system 900. The bus 910 may be a single bus or a combination of multiple buses. The computer system 900 includes a memory 902. The memory 902 may be a dynamic random access memory device, a static random access memory device, and/or other memory device. The memory 902 may store instructions and code represented by data signals that may be executed by the processor 901. A data storage device 903 is coupled to the bus 910. The data storage device 903 may be a hard disk drive, a floppy disk drive, a CD-ROM device, a flash memory device or other mass storage device.

A network controller 904 is coupled to the bus 910. The network controller 904 may link the computer system 900 to a network of computers (not shown) and supports communication among the machines. A display device controller 905 is coupled to the bus 910. The display device controller 905 allows coupling of a display device (not shown) to the computer system 900 and acts as an interface between the display device and the computer system 900. An input interface 906 is coupled to the bus 910. The input interface 906 may be, for example, a keyboard and/or mouse controller or other input interface. The input interface 906 allows coupling of an input device to the computer system 900 and transmits data signals from an input device to the computer system 900. It should be appreciated that computer systems having a different architecture or having different components may also be used to implement the computer system 900.

According to an embodiment of the present invention, a system designer 920 may reside in memory 902 and be executed by the processor 901. The system designer 920 may operate to generate a description of a system to be implemented on a target device, synthesize, map, place, and route the system onto the target device. The system designer 920 may also operate to design a PDN for a larger system that includes the target device. The system designer 920 automatically selects decoupling capacitor for the PDN. According to an embodiment of the present invention, board, package, die, system, and available capacitor parameters are provided to the system designer 920. Decoupling capacitors are selected by the system designer 920 to achieve one or more goals that may include reducing the space required for the decoupling capacitors on the board, and reducing the total cost for implementing the decoupling capacitors.

Figure 10:
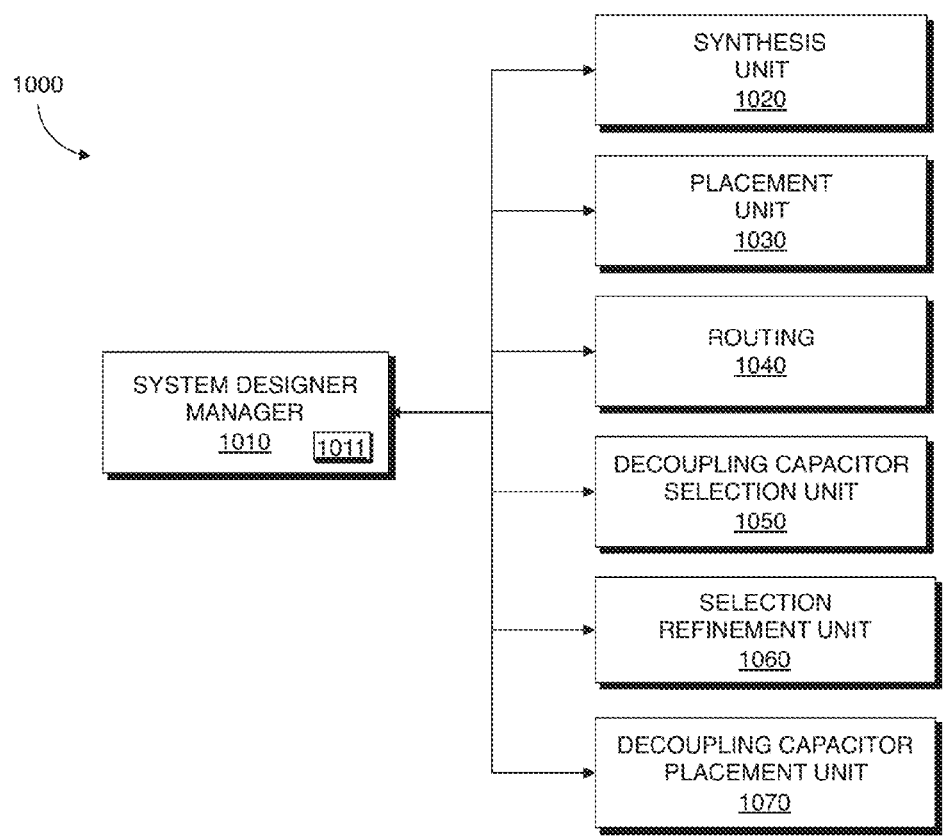
FIG. 10 is a block diagram of a system designer according to an embodiment of the present invention.

FIG. 10 illustrates a system designer 1000 according to an embodiment of the present invention. The system designer 1000 may be an EDA tool for designing a system on a target device such as an FPGA, structured application structured integrated circuit (ASIC), ASIC, or other circuitry. FIG. 10 illustrates modules implementing an embodiment of the system designer 1000. According to one embodiment, the modules represent software modules and system design may be performed by a computer system such as the one illustrated in FIG. 9 executing sequences of instructions represented by the modules shown in FIG. 10. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1000 includes a designer manager 1010. The designer manager 1010 is connected to and transmits data between the components of the system designer 1000. The designer manager 1010 also generates a representation of the system from a description of the system input by a designer. According to an embodiment of the present invention, the representation of the system generated may be a register transfer language (RTL) representation in a hardware description languages such as Verilog, very-high-speed integrated circuit (VHSIC) hardware description language (VHDL), or other descriptive language.

The system designer 1000 includes a synthesis unit 1020 that performs synthesis. The synthesis unit 1020 generates a logic design of a system to be implemented on the target device. According to an embodiment of the system designer 1000, the synthesis unit 1020 takes a conceptual HDL design definition and generates an optimized logical representation of the system. The optimized logical representation of the system generated by the synthesis unit 1010 may include a representation that has a minimized number of functional blocks and registers, such as logic gates and logic elements, required for the system. Alternatively, the optimized logical representation of the system generated by the synthesis unit 1020 may include a representation that has a reduced depth of logic and that generates a lower signal propagation delay.

The synthesis unit 1020 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 1000 includes a placement unit 1030 that processes the optimized technology-mapped netlist to produce a placement for each of the functional blocks. The placement identifies which components or areas on the target device are to be used for specific functional blocks and registers.

The system designer 1000 includes a routing unit 1040 that performs routing. The routing unit 1040 determines the routing resources on the target device to use to provide interconnection between the components implementing functional blocks and registers of the logic design.

The system designer manager 1010 includes a power estimation unit 1011 that identifies switching frequencies and logic components of a system synthesized by the synthesis unit 1020, placed by the placement unit 1030, and routed by the routing unit 1040 on the target device. The power estimation unit 1011 may also identify an amount of current that a PDN for a target device uses based upon characteristics of the system such as a number of logic cells, input output types, clock frequencies, and/or other components of the system.

The system designer 1000 includes a decoupling capacitor selection unit 1050 that selects decoupling capacitors for a PDN that supports the system on the target device. The PDN may also support a larger system that the system on the target device is a part of. According to an embodiment of the present invention, a target PDN impedance value for the PDN is computed. For each switching frequency of the target device where an effective PDN impedance value is greater than the target impedance value, decoupling capacitors are identified to add to the PDN to drive the effective PDN value below the target PDN value. The decoupling capacitor selection unit 1050 may operate to perform the procedure descried with reference to FIG. 6.

The system designer 1000 includes a selection refinement unit 1060. The selection refinement unit 1060 refines the selection of decoupling capacitors to reduce the cost of the system, reduce the space required for implementing the decoupling capacitors, and/or reduce the count of the decoupling capacitors. The selection refinement unit 1060 may operate to perform the procedures described with reference to FIG. 7.

The system designer 1000 includes a decoupling capacitor placement unit 1070. The decoupling capacitor placement unit 1070 may identify a side on a board to place the decoupling capacitors and/or determine locations on the board to place the decoupling capacitors. The selection refinement unit 1070 may operate to perform the procedures described with reference to FIG. 8.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a power distribution network (PDN) for a system implementing a target device, comprising:
   computing a target PDN impedance value for the PDN of the system;
   for each switching frequency within a designated range of switching frequencies of the target device where an effective PDN impedance value for the PDN is greater than the target PDN impedance value, identifying one or more decoupling capacitors for one or more capacitor types to add to the PDN to drive the effective PDN value below the target PDN value; and
   generating a placement solution on a board which the system is implemented on for the one or more decoupling capacitors identified by identifying a location on the board, unoccupied by another component, for the one or more decoupling capacitors in an order from largest in board footprint to smallest in board footprint, wherein at least one of the computing, identifying, and generating is performed by a processor.

2. The method of claim 1, wherein generating the placement solution comprises:
   identifying a closest available location for each of the one or more decoupling capacitors to a power pin;
   determining whether placement of the one or more decoupling capacitors at the available location satisfies placement constraints; and
   generate an error message in response to determining that a placement constraint has been violated.

3. The method of claim 2, wherein the placement constraints require that the one or more decoupling capacitors be placed within a determined distance of its power pin.

4. The method of claim 1, wherein generating the placement solution for the one or more decoupling capacitors comprises determining which of a top side and a bottom side on the board to place the one or more decoupling capacitors in response to a location of a power plane.

5. The method of claim 1 further comprising refining a selection of the one or more decoupling capacitors identified to reduce space required for implementing the PDN.

6. The method of claim 1 further comprising refining the selection of the one or more decoupling capacitors identified to reduce one or more of a cost of the PDN and space required for implementing the PDN.

7. The method of claim 6, wherein refining the selection of the one or more decoupling capacitors comprises reducing a number of the one or more decoupling capacitors of a first capacitor type identified.

8. The method of claim 6, wherein refining the selection of the one or more decoupling capacitors comprises replacing two decoupling capacitors of a first capacitor type with one decoupling capacitor of a second capacitor type.

9. The method of claim 6, wherein refining the selection of the one or more decoupling capacitors comprises replacing a first decoupling capacitor of a first capacitor type with a second decoupling capacitor of a second capacitor type, wherein the second capacitor type costs less than the first capacitor type.

10. The method of claim 1, wherein generating the placement solution for the one or more decoupling capacitors comprises:

identifying one of a top side and bottom side of the board closest to a power plane; and selecting one of the top side and bottom side of the board to place the one or more decoupling capacitors in response to the side of the board identified to be closest to the power plane.

11. The method of claim 1, wherein generating the placement comprises placing decoupling capacitors in a mirroring configuration where a top side configuration of the decoupling capacitors mirrors a bottom side configuration of the decoupling capacitors.

12. A non-transitory computer readable medium including a sequence of instructions stored thereon for causing a computer to execute a method comprising:

computing a target power distribution network (PDN) impedance value for a PDN of a system implemented on a board;

for each switching frequency within a designated range of switching frequencies of a target device where an effective PDN impedance value for the PDN is greater than the target PDN impedance value, identifying one or more decoupling capacitors for one or more capacitor types to add to the PDN to drive the effective PDN value below the target PDN value; and generating a placement solution for the one or more decoupling capacitors identified on the board by identifying a location on the board, unoccupied by another component, for the one or more decoupling capacitors from largest in board footprint to smallest in board footprint.

13. The non-transitory computer readable medium of claim 12, wherein generating the placement solution comprises:

identifying a closest available location for each of the one or more decoupling capacitors to a power pin;

determining whether placement of the one or more decoupling capacitors at the available location satisfies placement constraints; and generate an error message in response to determining that a placement constraint has been violated.

14. The non-transitory computer readable medium of claim 13, wherein the placement constraints require that the one or more decoupling capacitors be placed within a determined distance of its power pin.

15. The non-transitory computer readable medium of claim 12, wherein generating the placement solution for the one or more decoupling capacitors comprises identifying which of a top side and a bottom side on the board to place the one or more decoupling capacitors.

16. The non-transitory computer readable medium of claim 12 further comprising refining a selection of the one or more decoupling capacitors identified to reduce one or more of a cost for implementing the PDN and space required for implementing the PDN.

17. A system designer unit, comprising:

a decoupling capacitor selection unit that identifies a selection of one or more decoupling capacitors of one or more capacitor types to add to a power distribution network (PDN) to drive an effective PDN impedance value below a target PDN value for each switching frequency within a designated range of switching frequencies of the target device where the effective PDN impedance value for the PDN is greater than the target PDN impedance value; and a decoupling capacitor placement unit that generates a placement solution for the one or more decoupling capacitors identified on the board by identifying a location on the board, unoccupied by another component, for the one or more decoupling capacitors from largest in board footprint to smallest in board footprint, wherein at least one of the decoupling capacitor selection unit and decoupling capacitor placement unit is implemented in hardware.

18. The system designer of claim 17, wherein the decoupling capacitor placement unit identifies a closest available location for each of the one or more decoupling capacitors to a power pin, determines whether placement of the one or more decoupling capacitors at the available location satisfies placement constraints, and generates an error message in response to determining that a placement constraint has been violated.

19. The system designer of claim 17, wherein the decoupling capacitor placement unit identifies which of a top side and a bottom side on the board to place the one or more decoupling capacitors.

* * * * *